United States Patent [19]

Zimmerman et al.

[11] 4,209,422

[45] Jun. 24, 1980

[54] MULTICOMPONENT DEMULSIFIER, METHOD OF USING THE SAME AND HYDROCARBON CONTAINING THE SAME

[75] Inventors: Abraham A. Zimmerman, Summit; Jack Ryer, East Brunswick, both of N.J.

[73] Assignee: Exxon Research & Engineering Co., Florham Park, N.J.

[21] Appl. No.: 867,602

[22] Filed: Jan. 6, 1978

Related U.S. Application Data

[63] Continuation-in-part of Ser. No. 765,684, Feb. 4, 1977, abandoned.

[51] Int. Cl.$^2$ ............................................. B01D 17/04
[52] U.S. Cl. ....................................... 252/344; 44/51; 44/62; 252/358
[58] Field of Search ................... 252/344, 358; 44/51, 44/62

[56] References Cited

U.S. PATENT DOCUMENTS

| | | | |
|---|---|---|---|
| 2,643,979 | 6/1953 | Lindert | 252/344 X |
| 3,020,276 | 2/1962 | Hughes et al. | 252/344 X |
| 3,265,474 | 8/1966 | Siegel | 44/62 |
| 3,424,565 | 1/1969 | Ptacek et al. | 44/62 |
| 3,454,380 | 7/1969 | Dickson et al. | 44/62 |
| 3,528,928 | 9/1970 | Rushton | 252/344 X |
| 3,907,701 | 9/1975 | Liebold et al. | 252/344 |

*Primary Examiner*—Richard D. Lovering
*Attorney, Agent, or Firm*—Eugene Zagarella, Jr.

[57] ABSTRACT

A multicomponent demulsifier comprising an alkoxylated substituted-phenol-formaldehyde resin and at least two different alkoxylated polyamines or a quaternary ammonium salt and an alkoxylated polyamine. The demulsifier is useful in breaking hydrocarbon-in-water or water-in-hydrocarbon emulsions including those comprising a substituted hydrocarbon. Moreover, when the alkoxylated polyamines are used, rather than the quaternary ammonium salt, the multicomponent demulsifier retains reasonable effectiveness even after a first water phase has been separated.

15 Claims, No Drawings

MULTICOMPONENT DEMULSIFIER, METHOD OF USING THE SAME AND HYDROCARBON CONTAINING THE SAME

CROSS REFERENCE TO RELATED APPLICATIONS

This application is a continuation-in-part of copending U.S. application Ser. No. 765,684, filed Feb. 4, 1977 and now abandoned.

BACKGROUND OF THE INVENTION

This invention relates to a multicomponent additive combination, to a method of using the same to either break or prevent the formation of emulsions, and to hydrocarbon compositions containing the same. More particularly, the present invention relates to a multicomponent additive combination, to a method of using the same to break oil-in-water and/or water-in-oil emulsions and to hydrocarbon compositions containing the same.

As is well known, the performance of various petroleum products and other hydrocarbons can be adversely affected by the presence of water therein. As is also well known, water can be dispersed in such products during processing. For example, the presence of water is often found in gasoline storage. Moreover, sea water is often present with gasoline or petroleum products when the same are transferred from tankers and/or barges to stationary, land storage facilities. Such contamination is, of course, not, per se, bad and, indeed, long range deleterious effects can often be avoided by allowing sufficient settling time and thereafter decanting or otherwise separating the hydrocarbon and water phases.

Due to the large volumes stored and transported, however, the provision of adequate settling time is not, generally, practical. Moreover, when a hydrocarbon-water mixture, such as gasoline and water is subjected to high shear agitation, such as can occur in refinery blending and/or high shear pumping, such as can be encountered in transferring from tanker or barge to land storage or from tank to tank while in storage, relatively stable oil-in-water and water-in-oil emulsions can be formed. Then, upon settling the two emulsions will separate and decanting will permit separation of the two emulsions, but the hydrocarbon phase will contain water and the water phase will contain oil. The hydrocarbon phase would, in turn, exhibit the detrimental properties often exhibited by water-containing hydrocarbons. The oil in the water phase, on the other hand, could be carried out along during hydrocarbon transfer operations. Moreover, dirt, normally floating at the interphase, could be entrained in the hydrocarbon phase as well. The adverse effects of dirt on the performance of the hydrocarbon phase, especially where the hydrocarbon phase is a material such as gasoline is, of course, well known and need not be discussed herein.

The problems associated with the formation of stable emulsions have become more common in recent years and particularly since the advent of the use of additives possessing surfactant properties. In this regard, it should be noted that such additives have been used, with increasing frequency in water immiscible, organic liquids, such as synthetic and mineral oils, solvents and fuels, as dispersants, oxidation and rust inhibitors, anti-icing agents, pour point depressants, detergents, etc. In particular, ashless, oil soluble polymeric dispersants have largely displaced metal sulfonates, metal naphthenates and similar compounds for use as stabilizing additives in petroleum distillate fuels and related hydrocarbon oil products because of their increased ability to suspend insoluble degradation products formed in such oils. Sludge and sediment, which might otherwise tend to clog fuel lines, orifices, screens and filters through which the oils must pass, are held in suspension to a much greater extent by the polymeric additives than by the additive materials formerly employed. These increased dispersive properties, although highly desirable from the standpoint of oil stability, carburetor performance, and the like, have given rise to water tolerance problems much more serious than those heretofore encountered.

Polymeric surfactants employed as additives exhibit particularly pronounced tendencies to suspend any water with which the organic liquid mediums come into contact, and hence extremely persistant haze and stable emulsions are formed upon contact of oils containing the polymeric additives with water. Moreover, since an aqueous phase exist in most tanks and other vessels containing such oils, and other liquid hydrocarbons such as solvents and petroleum fuels, haze formation and emulsification are almost impossible to avoid. As a consequence, the marketability of these organic liquids and particularly the solvents and distillate fuels, lubricating oils, transformer oils, turbine oils, jet fuels, gasoline, heating oil and other petroleum products is often serious affected.

Heretofore, several methods have been proposed for breaking oil-in-water and water-in-oil emulsions. For the most part, these prior art processes involve the use of demulsifiers and the use of various alkoxylated alkylphenol-formaldehyde resins and various quaternary ammonium halides have been contemplated for this purpose. The prior art processes heretofore developed do not, however, function quickly and water is often contained in various hydrocarbons when the same reached the ultimate consumer. Moreover, significant quantities of hydrocarbon are lost when the water phase is discarded. Also, when the amount of water present during blending or other processing is relatively large, dirt will be entrained in the hydrocarbon reaching the consumer. This is, of course, due primarily to the short storage time allowed after blending and, this in turn is due primarily to the high current demand for such hydrocarbons. The need, then, for a demulsifying system which will break emulsions quickly and permit clean separation of the hydrocarbon in water phases is believed to be readily apparent.

SUMMARY OF THE INVENTION

It has now surprisingly been discovered that the foregoing and other disadvantages of the prior art demulsifying systems can be avoided or at least significantly reduced with the multicomponent demulsifier of the present invention and an improved method of breaking oil-in-water and/or water-in-oil emulsions provided thereby. It is, then, an object of this invention to provide an improved, multicomponent demulsifier. It is another object of this invention to provide such a multicomponent demulsifier which can be used to break oil-in-water and water-in-oil emulsions which contain one or more additives having surfactant properties. It is still another object of this invention to provide such a multicomponent demulsifier which can be used to effect relatively clean separation of the hydrocarbon and water phases after the emulsions have been broken. The foregoing and other objects and advantages will become apparent from the disclosure set forth hereinafter.

In accordance with the present invention, the foregoing and other objects and advantages are accomplished with a multicomponent demulsifier comprising an alkoxylated alkylphenol-formaldehyde resin and at least two different alkoxylated polyamines or a quaternary ammonium salt and at least one alkoxylated polyamine. As indicated more fully, hereinafter, each of the components of the demulsifier may be added directly and separately to the hydrocarbon or any two or more of the components may be first combined and thereafter added to the hydrocarbon. As also fully discussed hereinafter, best results will be obtained if the multicomponent demulsifier is added to the hydrocarbon before a stable emulsion is formed.

DETAILED DESCRIPTION OF THE INVENTION

As previously indicated, the present invention relates to a multicomponent demulsifier, to a method of using the same to either break or prevent the formation of both oil-in-water and water-in-oil emulsions and to various hydrocarbon compositions containing the same. The demulsifier of this invention is useful with essentially any hydrocarbon or hydrocarbon fraction and the same may be used by adding the demulsifier either to a hydrocarbon or a hydrocarbon-water mixture. The demulsifier is, however, most effectively used by adding the same to the hydrocarbon before the hydrocarbon is vigorously contacted with water and use in this manner is preferred.

The alkoxylated alkylphenol-formaldehyde resins useful in the multicomponent demulsifier of the present invention are prepared by alkoxylating an alkylphenol formaldehyde resin characterized by the following structural formula:

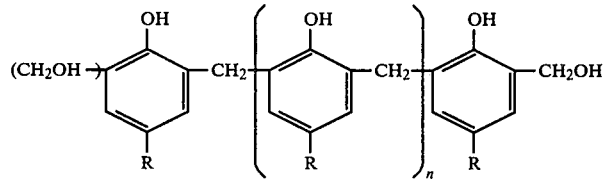

wherein each of the R's may be the same or a different hydrocarbon radical and n is an integer. In general, R could be any hydrocarbon radical which does not adversely affect the oil solubility of the alkoxylated reaction product but the straight and branched chain alkyl radicals having from about $C_3$ to about $C_{12}$ carbon atoms are particularly effective. The molecular weight of the alkylphenol-formaldehyde resin will generally vary from about 400 to about 3500.

It is essential to the present invention that the alkoxylated substituted phenol-formaldehyde resins be soluble in the hydrocarbon within which the same is to be used and that the same contains sufficient ether groups to be effective as a demulsifier. In general, then, n may be any integer, including 1, for which the resulting resin is soluble in the hydrocarbon in which the same is to be used. Optimum performance is, however, generally realized with gasoline and middle distillates when n is an integer from about 3 to about 8 and no real advantage will be realized by operating outside of this range. Nonetheless, availability will, generally, control the use and alkoxylated alkylphenol-formaldehyde resins wherein n is an integer from 1 to about 10 can be effectively used.

The alkoxylated alkylphenol-formaldehyde resins useful in the demulsifier of the present invention may be prepared in accordance with well known techniques by first forming the alkylphenol-formaldehyde resin and thereafter alkoxylating the same by reaction with one or more alkylene oxides having from about 2 to about 6 carbon atoms therein. R, in the previous formula, will be determined or fixed by the R attached to the phenol used in the preparation of the polymer and, in this regard, it should be noted that mixtures of such phenols could be used. The alkyl substitution will, however, generally be para with respect to the OH group in the phenol.

As is well known, the phenol-formaldehyde condensation is, generally, accomplished with an acid catalyst. The acid catalyst is, then, generally neutralized with excess caustic prior to effecting the alkoxylation. A weak acid is then used to neutralize the product resulting from alkoxylation.

In the preparation of materials useful in the present invention, from about 1 to about 100 moles of alkylene oxide will be added to the base phenol-aldehyde resin per mole of OH radicals therein and the alkoxylation reaction will be carried substantially to completion, i.e. such that each OH group is converted to an alkoxy radical having from about 1 to about 100 ether oxygens. Materials of this type are, of course, available commercially.

The alkoxylated polyamines which can be used in the multicomponent demulsifier of the present invention will be prepared by alkoxylation of a polyamine characterized by the following structural formula:

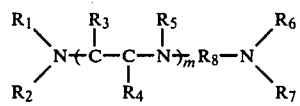

wherein each of $R_1$, $R_2$, $R_3$, $R_4$, $R_5$, $R_6$ and $R_7$ may be H or the same or a different hydrocarbon radical with the proviso that at least one of $R_1$, $R_2$, $R_6$ and $R_7$ is H, $R_8$ is a hydrocarbon radical having from about 2 to about 40 carbon atoms and m is an integer ranging from 0 to about 25. In general, and as previously indicated, each of $R_1$–$R_7$ may be, independently, either hydrogen or any hydrocarbon radical including alkyl, alkenyl, aryl, cyclic, alkaryl and alicyclic radicals. Also, these radicals may contain essentially any number of carbon atoms so long as the alkoxylated polyamine remains soluble in the hydrocarbon in which the same is to be used. Preferably, however, each of $R_1$–$R_7$ will be either hydrogen or an alkyl group selected such that the same will impart the desired solubility. Accordingly, each of $R_1$–$R_7$ will be, independently, either hydrogen or a hydrocarbon, preferably an alkyl group, having from about 1 to about 18 carbon atoms.

In general, a polyamine of essentially any molecular weight could be used to prepare the alkoxylated polyamine useful in the demulsifier of the present invention. Again, the sole limitation on molecular weight will be solubility of the final product in the hydrocarbon medium within which the same will be used. Polyamines having a molecular weight ranging from about 60 to about 4,000 or more and preferably from about 100 to about 1000 could be used to prepare the alkoxylated polyamine useful in the present invention.

Alkoxylated polyamines useful in the present invention may be prepared in accordance with known techniques and particularly in accordance with the techniques taught in U.S. Pat. No. 3,454,380. Such materials, then, may be prepared by polymerizing ethylene imine and/or substituted derivatives thereof. As indicated in U.S. Pat. No. 3,454,380, such polymerization can be effected in accordance with procedures set forth in U.S. Pat. No. 2,182,306 and elsewhere. The resulting polyethyleneimine is, in effect, a polyamine.

Alkoxylation of the polyamine can then be effected in accordance with known techniques using an alpha-beta alkylene oxide containing from about 2 to about 5 carbon atoms such as ethylene oxide, propylene oxide, butylene oxide and pentylene oxide. As also indicated in U.S. Pat. No. 3,454,380 extremely high alkylene oxide ratios will be used in the preparation of an alkoxylated polyamine which are intended for use as a demulsifier. In this regard, the use of from about 1 to about 100 moles of alkylene oxide per atom of nitrogen in the polymer has been found particularly effective in preparing demulsifiers useful in the composition of the present invention. Again the alkoxylation will be completed such that the resulting product contains from about 1 to about 100 ether oxygens per nitrogen atom.

As is well known, and as indicated previously, the alkoxylation can be accomplished with a caustic catalyst. When this is done, a weak acid will, generally, be used to neutralize the catalyst and excess acid could result in some esterification. Such esterification is not, per se, detrimental in the present invention, but care will generally be taken to avoid the same.

As previously indicated, the preferred composition will contain at least two different alkoxylated polyamines and good results are obtained when the number of nitrogen atoms in the two polyamines differ by at least two. Alkoxylated polyamines differing in the number of nitrogen atoms by at least four are, however, preferred and those differing by 4 to 8 are most preferred. Moreover, outstanding results have been realized when one of the polyamines is a diamine and, as a result, compositions comprising an alkoxylated diamine are particularly preferred.

When a diamine is used, m is the aforementioned general formula for polyamines will be zero and the diamines will be characterized by the following general formula:

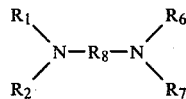

wherein $R_8$ is, as indicated previously, a hydrocarbon radical having from about 2 to about 40 carbon atoms and each of $R_1$, $R_2$, $R_6$ and $R_7$ are, as indicated previously, independently, H or the same or a different hydrocarbon radical having from about 1 to about 18 carbon atoms it being understood, however, that at least one of $R_1$, $R_2$, $R_6$ and $R_7$ must be H. When any of the noted R groups are hydrocarbon, then the same may be straight and branched chain aliphatic radicals, straight and branched chain olefinic radicals, straight and branched chain acetylenic radicals, aromatic radicals, alkyl and alkenyl substituted aromatic radicals, cyclic radicals and alkyl and alkenyl substituted cyclic radicals.

The alkoxylated diamines useful in the present invention may be prepared by any of the techniques heretofore described or known in the prior art to yield from about 1 to about 100 ether oxygens per nitrogen atom. In this regard, it should be noted that the diamine may be prepared by starting with a dicarboxylic acid having a desired hydrocarbon radical separating the two carboxyl groups and then converting the same to the corresponding amide and then to the amine. The amine can then, in turn, be alkoxylated by reaction with from about 1 to about 100 moles of alkylene oxides per nitrogen atom. Again, the alkoxylation can be effected in the presence of a caustic catalyst and the reaction mixture then neutralized with a weak acid. Alkoxylated diamines of the type used on the present invention are, of course, commercially available.

As previously indicated, a quaternary ammonium compound can be substituted for one of the alkoxylated polyamines, and particularly the polyamine having the larger number of nitrogen atoms, in the demulsifier of the present invention. The effect of quaternary ammonium compounds on the water tolerance of hydrocarbons is, of course, taught in U.S. Pat. No. 3,265,474 and all of the quaternary ammonium compounds taught in this patent can be used in the composition of the present invention. Useful quaternary ammonium salts include those containing two lower alkyl groups of about 1 to about 3 carbon atoms and two higher alkyl groups of about 8 to about 20 carbon atoms. Particularly preferred are the dialkyl dimethyl quaternary ammonium salts wherein the alkyl groups each contain from about 12 to about 14 carbon atoms. As indicated in U.S. Pat. No. 3,265,474 the nature of the anionic radical is not critical and the same may be a halide such as a chloride, iodide or bromide, alkoxy radicals such as methoxy, ethoxy, a weak acid radical like acetate or a strong acid radical like sulfate, nitrate or a hydroxide or any combination thereof. Due to commercial availability, the halides, particularly the chloride are the preferred anionic radical.

In general, the demulsifier of the present invention may be formed by first combining the components thereof in a suitable solvent and a suitable relative concentration such that the combination when added to a hydrocarbon will provide the effective, relative concentration of each component therein. Alternatively, each component of the demulsifier could be added directly to the hydrocarbon water mixture at the concentration desired.

In general, the alkoxylated alkylphenol-formaldehyde resin will be effective at a concentration within the range from about 1 to about 20 ppm in the hydrocarbon. Similarly, the higher nitrogen content alkoxylated polyamine or the quaternary ammonium salt will be used at a concentration within the range from about 0.5 to about 10 ppm while the lower nitrogen content alkoxylated polyamine (or diamine) will be used at a concentration within the range from about 0.5 to about 10 ppm. It is important to the present invention that the alkoxylated alkylphenol-formaldehyde resin, the higher nitrogen content alkoxylated polyamine (or quaternary ammonium salt) and the lower nitrogen content alkoxylated polyamine (or diamine) be used in a relative weight ratio within the range of from about 1.5:1 to about 3:1 formaldehyde resin/amine (i.e., either higher or lower nitrogen content amine). Moreover, it is important to the present invention that the weight ratio of the higher nitrogen content alkoxylated polyamine and/or quaternary ammonium salt to the lower nitrogen content alkoxylated polyamine (or diamine) be maintained within the range from about 0.5:1 to about 2:1.

In general, and when a concentrated demulsifier is desired, the same may be prepared in any suitable solvent in which all components of the demulsifier are soluble and, ideally, the solvent also will be one compatible with, if not identical to, the hydrocarbon within which the demulsifier is to be used. For the various oils, fuels and distillate fractions within which the demulsifier might be used, such solvents include the various aromatic solvents such as benzene, toluene, xylene and the like, the various naphthas and particularly those which contain relatively high aromatic concentration such as the heavy aromatic naphthas.

When a concentrated demulsifier is prepared, care should be exercised to maintain the relative weight and/or molar concentrations heretofore specified. Generally, such concentrated solutions will contain from about 25 to about 75 wt. % of the various components constituting the demulsifier.

In general, the demulsifier of the present invention may be used to break emulsions formed with any hydrocarbon an/or halogenated hydrocarbon. Such materials include the aromatic, alicyclic and aliphatic solvents such as xylene, benzene, toluene, cyclohexanol and the like and the various fuels and oils such as gasoline, aviation turbo jet fuels, kerosenes, diesel fuels, transformer oils, turbine oils, heating oils and the various lubricating oils.

In general, the conditions used to effect the demulsification are important and, indeed, the demulsification should be effected at temperatures of about 40° to 120° F. Also, in effecting demulsification, it is important that the demulsifier be uniformly distributed throughout the system. This could, then, be effectively accomplished by adding the demulsifier to either the hydrocarbon phase or the hydrocarbon-water mixture prior to subjecting the same to those conditions which could or would result in formation of a relatively stable emulsion.

PREFERRED EMBODIMENT

In a preferred embodiment of the present invention, an alkoxylated para-t-amyl phenol-formaldehyde resin prepared with a para-t-amyl phenol-formaldehyde resin having an average molecular weight the range from about 500 to about 1300 will be used to demulsify a gasoline-in-water and a water-in-gasoline emulsion.

Also in the preferred embodiment an alkoxylated diamine prepared with a dimer of a $C_{12}$ to $C_{20}$ ethylenically unsaturated fatty acid will be used. Also, the alkoxylation will be accomplished with from about 75 to about 100 moles of propylene oxide per mole of diamine and with about 15 to about 25 moles of ethylene oxide per mole of diamine.

In the preferred embodiment, the higher nitrogen content alkoxylated polyamine will be one prepared by first polymerizing a $C_4$–$C_{18}$ alkyl substituted ethyleneimine and thereafter alkoxylating the resulting polyamine with either ethylene oxide, propylene oxide or a mixture of both such that the final, alkoxylated polymer contains from about 10 to about 50 ether groups per nitrogen atom.

In the preferred embodiment, the alkoxylated para-t-amyl phenol-formaldehyde resin, the alkoxylated diamine and the alkoxylated polyamine will be combined in a solvent at a relative concentration of from about 1.8 to about 2.8 parts by weight of the alkoxylated phenolaldehyde resins per part by weight of the higher nitrogen content alkoxylated polyamine or lower nitrogen content alkoxylated polyamine (diamine) and, correspondingly from about 0.8 to about 1.2 parts by weight of the higher nitrogen content alkoxylated polyamine per part by weight of the alkoxylated diamine. This concentrated multicomponent demulisifer will contain the active ingredients in the solvent at a concentration within the range from about 35 to about 65 wt. % and the same will be prepared in an aromatic solvent such as xylene, toluene or the like, mixture of aromatic solvents and alcohols or an alcohol. Moreover, the multicomponent demulsifer of this invention could be combined in a concentrated package with a dispersant, and particularly a dispersant intended for use in the hydrocarbon composition to be treated.

The concentrated demulsifier will then be added to a gasoline or a gasoline-water mixture such that the concentration of the alkoxylated phenol-formaldehyde resin is within the range from about 1.5 to about 8 ppm, the concentration of the alkoxylated diamine is within the range from about 0.7 ppm to about 4 ppm and the concentration of the alkoxylated, higher nitrogen content polyamine is within the range from about 0.7 to about 4 ppm.

It should be noted that the use of the alkoxylated, higher nitrogen content polaymine is preferred rather than the quaternary ammonium salt. This preference is due, however, primarily to the fact that the alkoxylated polyamine will remain in the hydrocarbn phase and therefore will remain present so as to prevent the formation of a stable emulsion during subsequent handling or treatment. The quaternary ammonium salts, on the other hand, while being effective to break any emulsion that might otherwise form subsequent to the time of introduction will, generally, remain in the water phase and therefore would not be present to prevent the formation of a stable emulsion during subsequent handling. When such a compound is used, therefore, it will be necessary to again add this material to the hydrocarbon phase each time a hydrocarbon phase is separated from a water phase.

Having thus broadly described the present invention and set forth a preferred embodiment thereof, it is believed that the same will become even more apparent by reference to the following examples. These examples are, however, intended solely for the purpose of illustration and should not be construed so as to limit the invention.

EXAMPLE 1

In this example, a three component demulsifier was added to a premium quality gasoline at several different relative concentrations but in all cases at a total concentration of 2 ptb (pounds per thousand barrels—for gasoline 1 ptb=3.8 ppm). In each test 500 ml of gasoline was combined with 5 milliliters of a synthetic sea water and the gasoline-sea water mixture then subjected to agitation at about 3700 rpm for about 20 seconds in a Waring blender. The time required to 0 emulsion was then determined at each relative concentration.

In each test, a mixture of alkoxylated para-t-amyl phenol-formaldehyde resins were used in combination with an alkoxylated diamine and an alkoxylated polyamine. The mixture of two alkoxylated para-t-amyl phenol-formaldehyde resins were prepared with a para-t-amyl phenol-formaldehyde resin having an average molecular weight of about 750. The first such alkoxylated phenol-formaldehyde resin was prepared by alkoxylating the base resin with about one mole of ethylene oxide per mole of hydroxyl group in the base polymer. The second polymer, on the other hand was prepared by alkoxylating with a mixture of alkylene oxides containing about 1.5 moles of ethylene oxide and about 3 moles of propylene oxide for each hydroxyl group in the basic polymer. The two polymers were then combined with a high aromatic naphtha. The weight ratio in the mixture was about 1.5 parts of the ethylene oxide polymer to each one part of ethylene oxidepropylene oxide polymer and the active ingredients constituted about 89% of the total mixture. The alkoxylated diamine used in this example was prepared by first dimerizing oleic acid and thereafter converting the dicarboxylic acid to a diamine. The diamine was then alkoxylated with a mixture containing about 18 moles of ethylene oxide per mole of diamine and 84 moles of propylene oxide per mole to diamine. The exact method of preparation of the alkoxylated, higher nitrogen content polyamine is not known since the same was purchased on the open market. It is, however, believed that the material was prepared from a polyamine within the scope of those heretofore described and it is known that the same contained at least 50 carbon atoms per nitrogen group and that the alkoxylated derivative contained at least 20 oxygen atoms per nitrogen atom.

In each test, the multi-component demulsifier was added to 500 milliliters of a premium grade gasoline containing 43 ppm of alkyl substituted succinimide dipersant. In each test, the time to 0 emulsion was determined. The results obtained in each test are recorded in the Table set below along with the concentration of each of the components in the multicomponent demulsifier. The concentrations actually shown do, however, include any solvent that was present.

TABLE

| Concentration of Demulsifier Components, ptb | | | Average time to Zero Emulsion, minutes |
|---|---|---|---|
| Alkoxylated para-t-amyl phenol-formaldehyde resin | Alkoxylated diamine | Alkoxylated polyamine | |
| 1 | 0.5 | 0.5 | 11 |
| 1 | 0.33 | 0.67 | 16 |
| 1 | 0 | 1 | 18 |
| 1 | 1 | 0 | >18 |
| 0.67 | 0.67 | 0.67 | >18 |

EXAMPLE 2

After the hydrocarbon and water phases had separated in Experiment 1, the water was withdrawn and a second sample of 5 ml of simulated sea water was added to the same hydrocarbon phase. The mixture as then again subjected to agitation at about 3700 rpm for 20 seconds in a Waring Blender. The time to 0 emulsion was again determined and the results obtained are set forth in the Table below:

TABLE

| Concentration of Demulsifier Components, ptb | | | Average time to Zero Emulsion, minutes |
|---|---|---|---|
| Alkoxylated para-t-amyl phenol-formaldehyde resin | Alkoxylated diamine | Alkoxylated polyamine | |
| 1 | 0.5 | 0.5 | 22 |
| 1 | 0.33 | 0.67 | >120 |
| 1 | 0 | 1 | >91 |
| 1 | 1 | 0 | >60 |
| 0.67 | 0.67 | 0.67 | >63 |

From the foregoing, it is believed readily apparent that while the demulsifier of the present invention is quite effective in breaking emulsions formed with seawater at least in the first instance, the result obtained even in the second instance were significantly better than in the case where other demulsifier combinations were used. Moreover, the results obtained with the first multicomponent demulsifier are particularly surprising with respect to the time required in the second instance.

EXAMPLE 3

In this example, 2500 ml of a premium quality gasoline were combined with 2.5 ml water, 0.8 ptb of an alkoxylated para-t-amyl phenol-formaldehyde resin, 0.3 ptb of an alkoxylated diamine and 0.3 ptb of an alkoxylated higher nitrogen content polyamine. The para-t-amyl phenol-formaldehyde resin used in this experiment was alkoxylated with a mixture of ethylene and propylene oxides containing about 4 mole of ethylene oxide per mole of OH groups in the base polymer and about 8 moles of propylene oxide per mole of hydroxy groups in the base polymer. The alkoxylated diamine and the alkoxylated higher nitrogen content polyamine was identical to those used in the previous examples. The water phase added to the gasoline has a pH of 4.

The gasoline, demulsifiers and water were combined in a pump-around system and continuously circulated using a centrifugal pump (e.g. Eastern Industries Inc. Type U34B, single stage centrifugal pump 316 S.S. MRT seal explosion proof 115 volt 60 cycle one phase motor). Samples were periodically withdrawn and the time to filter through in a 0.5μ filter determined. In this example, the time required to filter was less than 100 seconds. Without the disclosed demulsifier package the time for filtration was in excess of 200 seconds.

What is claimed is:

1. A multicomponent demulsifier comprising (a) an alkoxylated alkylphenol-formaldehyde resin wherein said alkyl may be one or more alkyl groups having from about 3 to about 12 carbon atoms and the alkoxylation of said resin is effected using about 1 to about 100 moles of one or more alkylene oxides per mole of OH radicals in said resin, said alkylene oxide having from about 2 to about 6 carbon atoms, and (b) at least two alkoxylated polyamines wherein the number of nitrogen atoms in the polyamines differ by at least two and wherein the alkoxylation of said polyamines is effected using from about 1 to about 100 moles of one or more alkylene oxides per atom of nitrogen in the polyamine and wherein said alkylene oxides have from about 2 to about 5 carbon atoms, the amount of alkoxylated alkylphenol-formaldehyde used varying from about 1.5:1 to about 3:1 parts by weight of said formaldehyde resin per part by weight of either the higher or lower nitrogen content alkoxylated polyamine and the amount of polyamines varying from about 0.5:1 to about 2:1 parts by weight of higher nitrogen content alkoxylated polyamine per part by weight of lower nitrogen content alkoxylated polyamine.

2. The multicomponent demulsifier of claim 1 wherein said higher nitrogen content alkoxylated polyamine is derived from a polyamine having a molecular weight of from about 60 to about 4,000.

3. The multicomponent demulsifier of claim 2 wherein the alkyl substituted phenol-formaldehyde resin is a tertiary alkyl-phenol-formaldehye resin.

4. The multicomponent demulsifier of claim 2 wherein one of the alkoxylated polyamines is an alkoxylated diamine.

5. The multicomponent demulsifier of claim 4 wherein said diamine has the formula:

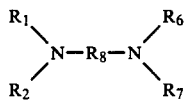

wherein each $R_1$, $R_2$, $R_6$ and $R_7$ are independently either hydrogen or a hydrocarbon radical having about 1 to about 18 carbon atoms and $R_8$ is a hydrocarbon radical having from about 2 to about 40 carbon atoms.

6. The multicomponent demulsifier of claim 5 wherein from about 1.8:1 to about 2.8:1 parts by weight of the alkoxylated alkylphenol-formaldehyde resin per part by weight of either the higher or lower nitrogen content alkoxylated polyamine is used and from about 0.8:1 to about 1.2:1 parts by weight of higher nitrogen content alkoxylated polyamine per part by weight of lower nitrogen content alkoxylated polyamine is used.

7. The multicomponent demulsifier of claim 6 wherein said alkyl substituted phenol-formaldehyde resin is a tertiary alkyl-phenol-formaldehyde, said diamine is prepared from a dimer of $C_{12}$ to $C_{20}$ ethylenically unsaturated fatty acid and the other alkoxylated polyamine is obtained through the polymerization of ethyleneimine or a substituted ethyleneimine wherein said substituent is an alkyl group of about 4 to about 18 carbon atoms.

8. The multicomponent demulsifier of claim 5 wherein the diamine is prepared from a dimer of $C_{12}$ to $C_{20}$ ethylenically unsaturated fatty acid.

9. The multicomponent demulsifier of claim 8 wherein the other alkoxylated polyamine is obtained through the polymerization of ethyleneimine or a substituted ethyleneimine wherein said substituent is an alkyl group of about 4 to about 18 carbon atoms.

10. A method of using the demulsifier of claim 9 comprising the steps of first combining the demulsifier with a hydrocarbon and allowing the demulsifier to be distributed through the mixture.

11. The method of claim 10 wherein said hydrocarbon is gasoline.

12. A multicomponent demulsifier comprising (a) an alkoxylated alkylphenol-formaldehyde resin wherein said alkyl may be one or more alkyl groups having from about 3 to about 12 carbon atoms and the alkoxylation of said resin is effected using about 1 to about 100 moles of one or more alkylene oxides per mole of OH radicals in said resin, said alkylene oxide having from about 2 to about 6 carbon atoms, (b) a quaternary ammonium salt having two lower alkyl groups of about 1 to about 3 carbon atoms and two higher alkyl groups of about 8 to about 20 carbon atoms and (c) an alkoxylated polyamine wherein the alkoxylation of said polyamine is effected using from about 1 to about 100 moles of one or more alkylene oxides per atom of nitrogen in the polyamine and wherein said alkylene oxides have from about 2 to about 5 carbon atoms, the amount of alkoxylated alkylphenol-formaldehyde used varying from about 1.5:1 to about 3:1 parts by weight of said formaldehyde resin per part by by weight of either the quaternary ammonium salt or alkoxylated polyamine and the amount of quaternary ammonium salt and alkoxylated polyamine varying from about 0.5:1 to about 2:1 parts by weight of quaternary ammonium salt per part by weight of alkoxylated polyamine.

13. The multicomponent demulsifier of claim 12 wherein said quaternary compound has two methyl groups and two dialkyl groups of about 12 to 14 carbon atoms.

14. The multicomponent demulsifier of claim 12 wherein the alkoxylated polyamine is a diamine.

15. A hydrocarbon composition containing (a) an alkoxylated alkyl substituted phenol-formaldehyde resin wherein said alkyl substituent may be one or more alkyl groups having from about 3 to about 12 carbon atoms and the alkoxylation of said resin is effected using from about 1 to about 100 moles of one or more alkylene oxides per mole of OH radicals in said resin, said alkylene oxide having from about 2 to about 6 carbon atoms and (b) at least two alkoxylated polyamines wherein the number of nitrogen atoms in the polyamines differ by at least two and wherein the alkoxylation of said polyamines is effected using from about 1 to about 100 moles of one or more alkylene oxides per atom of nitrogen in the polyamine and wherein said alkylene oxides have from about 2 to about 5 carbon atoms, the amount of alkoxylated alkylphenol-formaldehyde used varying from about 1.5:1 to about 3:1 parts by weight of said formaldehyde resin per part by weight of either the higher or lower nitrogen content alkoxylated polyamine and the amount of polyamines varying from about 0.5:1 to about 2:1 parts by weight of higher nitrogen content alkoxylated polyamine per part by weight of lower nitrogen content alkoxylated polyamine.

* * * * *